(12) United States Patent
Pignot et al.

(10) Patent No.: US 7,151,867 B2
(45) Date of Patent: Dec. 19, 2006

(54) OPTICAL COUPLER HAVING PROTECTIVE SHEATH

(75) Inventors: Patrick Pignot, Le Mans (FR); Xavier Salmon, Ruaudin (FR)

(73) Assignee: Souriau, Versailles (FR)

( * ) Notice: Subject to any disclaimer, the term of this patent is extended or adjusted under 35 U.S.C. 154(b) by 354 days.

(21) Appl. No.: 10/622,970

(22) Filed: Jul. 17, 2003

(65) Prior Publication Data

US 2005/0259913 A1    Nov. 24, 2005

(30) Foreign Application Priority Data

Jul. 17, 2002  (FR) ................................ 02 09087

(51) Int. Cl.
G02B 6/26 (2006.01)
G02B 6/255 (2006.01)
G02B 6/42 (2006.01)

(52) U.S. Cl. .................. 385/15; 385/89; 385/39; 385/51; 385/95

(58) Field of Classification Search ............. 385/15, 385/45, 48, 50, 51, 95, 99
See application file for complete search history.

(56) References Cited

U.S. PATENT DOCUMENTS

| 4,083,625 | A |   | 4/1978  | Hudson |
|-----------|---|---|---------|--------|
| 4,184,739 | A |   | 1/1980  | d'Auria et al. |
| 4,783,137 | A | * | 11/1988 | Kosman et al. ............... 385/53 |
| 4,923,268 | A | * | 5/1990  | Xu ............................. 385/50 |
| 5,384,875 | A | * | 1/1995  | Shannon et al. .............. 385/51 |
| 5,652,814 | A | * | 7/1997  | Pan et al. ..................... 385/24 |

FOREIGN PATENT DOCUMENTS

| DE | 2916961 | 11/1980 |
| EP | 0833174 | 4/1998 |

\* cited by examiner

Primary Examiner—John D. Lee
Assistant Examiner—Omar Rojas
(74) Attorney, Agent, or Firm—Boyle, Fredrickson, Newholm, Stein & Gratz, S.C.

(57) ABSTRACT

An optical coupler (1) comprises two optical fibers (2, 3). Each of the optical fibers connects a sender unit (4) to a first end (9, 10). Then each of these fibers is connected independently to two independent receivers (6, 8). At the sender unit (4), the fibers are bared to be inserted into the same sleeve (15) which may be presented before the optical beam sent out by the sender unit. The bared intermediate zone between the sleeve and the non-bared cable portion is protected by a first sheath inside which the bared optical fibers are floating, and by a second protective sheath.

14 Claims, 1 Drawing Sheet

OPTICAL COUPLER HAVING PROTECTIVE SHEATH

BACKGROUND OF THE INVENTION

1. Field of the Invention

An object of the present invention is an optical coupler. An optical coupler of this kind is used to transmit an optical signal between a first device on the one hand and at least two second devices on the other. For example, an optical coupler links a sender device or sender unit sending an optical signal to two receivers of this optical signal. It can be used more particularly in the monitoring of control devices, especially those positioned in locomotives. Such couplers provide redundancy and even multiple back-up for surveillance systems. This coupler implements two optical fibers and has the advantage of transmitting the signal with almost no loss and without disturbance since it is not subject to electromagnetic disturbance. Indeed, with a coupler according to the invention, the losses between the signal sent and the signal received amount to less than 3 decibels.

2. Description of the Prior Art

In the prior art, there is a known optical coupler used, for example, to connect a sender unit to two receivers. On the sender unit side, this coupler has a first optical fiber having a first end that faces an optical source. Since the second end of this first optical fiber cannot be presented directly so that it faces two different receivers, the coupler can be used to connect the first fiber to two other fibers, each positioned so as to face a different receiver in order to transmit the sent signal to each of these receivers.

Generally, a coupler is centralized by joining the two fibers together so that the light can pass from the sender unit to the two receivers, or else it can be made by juxtaposing the two "receiver" fibers which will then be aligned and positioned so as to be facing the "sender" fiber. In order that the signal conveyed in the first "sender" optical fiber may be satisfactorily transmitted to the two "receiver" optical fibers, each of these "receiver" optical fibers should be presented so as to face the beam sent out by the "sender" fiber. To this end, since an optical fiber is generally surrounded by a sheath and a cable, the ends of the two "sender" optical fibers are generally completely stripped of their sheath so that they can be bonded as closely together as possible. Thus, if the beam given by the optical signal conveyed by the first optical fiber has a certain diameter, it is seen to it that the two second optical fibers are arranged in such a way that they equitably share the position facing the beam.

In general, all the optical fibers of the coupler have a same external diameter with or without sheath, and a same internal diameter. When the two fibers are bared, and attached together, then the distance between the two centers is equal to twice the radius of the fiber.

To reduce the losses between the first optical fiber and the two second optical fibers, there are prior art solutions in which the beam is widened so that it covers the totality of the attached surfaces of the bared ends of the two second optical fibers. In this case, a lens needs to be positioned between the first optical fiber and the two second optical fibers. This assembly is difficult to make and costly. Moreover, it does not completely reduce signal losses.

It is an object of the invention to resolve the problem posed. Indeed, an optical coupler according to the invention very appreciably restricts signal transmission losses. Indeed, the optical coupler of the invention is made in such a way that each of the two optical fibers, each connected to a receiver, as described in the example described here above, has one end positioned so as to be directly facing the beam sent out by the sender device. Reciprocally the invention also enables transmission without signal losses even if each of the two fibers is respectively connected to a sender unit and if each of these two fibers is presented so as to be facing a common receiver.

Indeed, with a coupler according to the invention, a single sender unit is connected to two different receivers by means of two distinct optical fibers each receiving the same signal sent. The particular feature of the invention is that the two optical fibers are attached to each other on the side where the first device is a single device and this first device sends a signal to be transmitted to the several other devices, or this first device receives signals coming from several other devices.

In preferred embodiments, the manner of attaching the two optical fibers gives loss-free transmission and furthermore brings the two optical fibers close to each other to the greatest possible extent so that they are presented in one and the same connector. Indeed, the two optical fibers are partially bared and inserted into a same sleeve.

SUMMARY OF THE INVENTION

An object of the invention is an optical coupler to transmit an optical signal between a sender device and at least two receiver devices, the coupler comprising at least two optical fibers, each second device being respectively presented before a first end of a fiber, characterized in that two fibers have second ends attached together in a position facing the device of the sender.

Reciprocally, the invention also enables the transmission of the signal sent by two different sender units to a single receiver.

In an equivalent way, an object of the invention is an optical coupler to transmit an optical signal between one first device and at least two second devices.

BRIEF DESCRIPTION OF THE DRAWINGS

The invention will be understood more clearly from the following description and the accompanying figures. These figures are given purely by way of an indication and in no way restrict the scope of the invention. Of these figures.

MORE DETAILED DESCRIPTION

Figure 1:
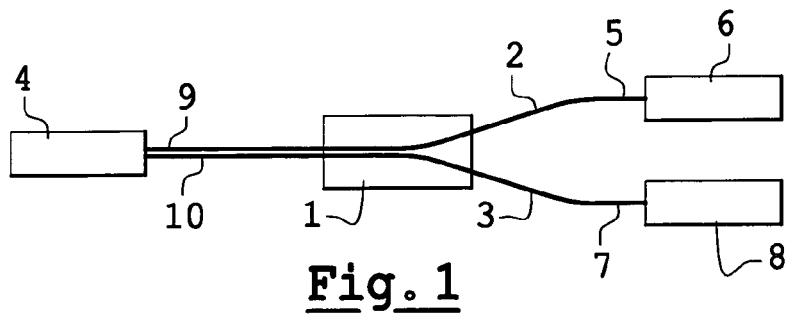
FIG. 1 is a drawing showing the principle of a coupler.

FIG. 1 shows an optical coupler 1. This optical coupler 1 has at least two optical fibers. It has, for example, a first optical fiber 2 and a second optical fiber 3. The optical coupler is connected to a first device 4. The two optical fibers 2 and 3 are therefore connected to this first device 4. Furthermore, a first end 5 of the first optical fiber 2 is connected to a first second device 6. Similarly, a first end 7, such as the end 5, is connected to a second second device 8, such as the device 6. For example, the second second device 8 is identical to the first second device 6 so as to perfectly duplicate and secure the transmission of the optical signal conveyed in the coupler 1.

In a first embodiment, the first device 4 is a device comprising a source for sending an optical signal. According to this embodiment, the second ends 9 and 10 of the first and second optical fibers 2 and 3 respectively are positioned so as to be facing a light source of the sender unit 4. In this case, the second devices 6 and 8 are devices comprising receivers of this optical signal. For example, the second devices 6 and 8 are optoelectronic devices enabling the conversion of the optical signal received into an electrical signal that can be used by a control system for example.

In one variant, according to a second particular embodiment of the invention, the first device 4 may be a receiver and, in this case it receives the optical signals sent by the senders 6 and 8 respectively through the optical fibers 2 and 3. In this second variant, the making of the coupler 1 and of its optical fibers is not changed in any way. This second embodiment will be deduced from the first embodiment described in greater detail here below.

Figure 2A:
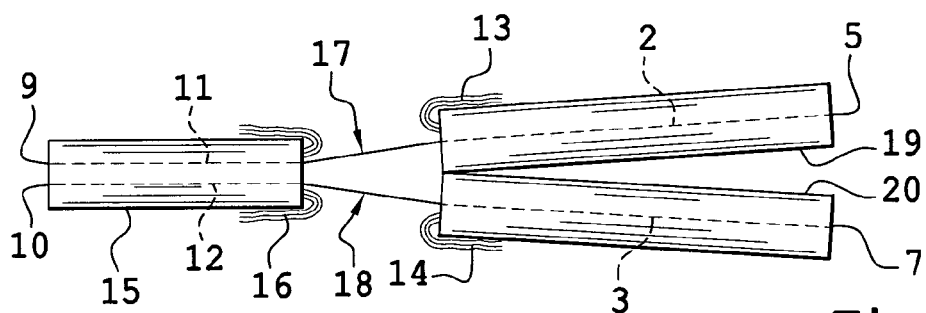
FIG. 2a is a drawing showing the principle of a coupler according to the invention during a first step of manufacture.

Indeed, to make an optical coupler according to the invention, according to a first manufacturing step shown in FIG. 2a, the first fiber 2 and the second fiber 3 are bared so that each of them has a front end with only the bared optical fiber surrounded by its fine protective coat alone. The optical fibers 2 and 3 are indeed made in such a way that each of them has a bared optical fiber surrounded by its protective sheath and then surrounded by wicks 13 and 14 forming a plait or meshwork around the bared optical fiber. The unit is surrounded by a first sheath thus forming a cable.

The first optical fiber 2 therefore has a bared end 11 formed solely by the bared optical fiber. Similarly the second optical fiber 3 has a second bared end 12. The bared ends 11 and 12 preferably have a same length. For example they have a length of about 10 to 20 cm. The wicks 13 and 14 respectively of the fibers 2 and 3 are spread apart at the ends 11 and 12. During this first step, the ends of the bared optical fibers 11 and 12 are inserted into a sleeve 15. This sleeve 15 has an internal diameter that is just rightly sized to receive the two bared optical fibers 11 and 12. The two optical fibers 11 and 12 are attached to it. They may even be bonded into the sleeve.

In one embodiment presenting more than two optical fibers to be connected to a same first device 4, the internal diameter of the sleeve 15 is designed so that it can receive as many optical fibers as have to be inserted and attached therein.

The sleeve 15 may, if necessary, also have wicks 16 on its outer rim forming a plait identical to that formed by the wicks 13 and 14. These wicks 16 are made to diverge from the connection zone so as not to hamper the insertion of the bared optical fibers 11 and 12 into the sleeve 15. They are inserted therein in such a way that their end is presented in a plane forming a connection face of the sleeve 15.

The mounting of these bared optical fibers in the sleeve 15 is done with relative flexibility. For each of the bared optical fibers, there is therefore a portion of bared optical fiber that is not inserted into the sleeve 15. For example, the first bared optical fiber 11 has a portion 17 and the second bared optical fiber 12 has a portion 18. These portions 17 and 18 are no longer surrounded by their respective sheaths and are positioned between the sleeve 15 on the one hand and the optical fibers portions on the other hand. These optical fiber portions, for their part, are still provided with their protective sheath.

Figure 2B:
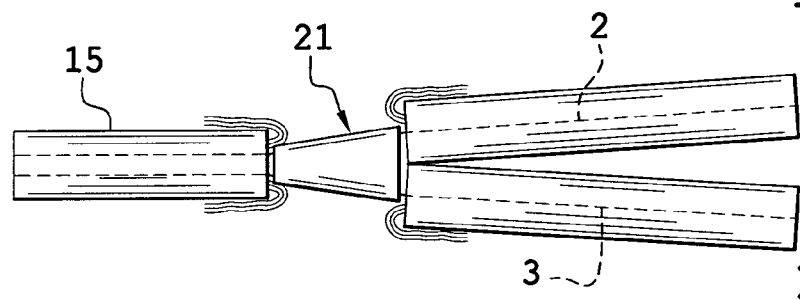
FIG. 2b is a drawing showing the principle of a coupler according to the invention during a second step of manufacture.

As shown in FIG. 2b, during the second step, these bared optical fiber portions 17 and 18 are provided with a first, or inner sheath 21. The portions 17 and 18 nevertheless remain sliding within this first sheath 21. The sheath 21 is preferably heat-shrinkable and shrinks under the effect of heat on the two portions 17 and 18. This makes such fibers easier to handle in allowing them to be slightly curved.

Figure 2C:
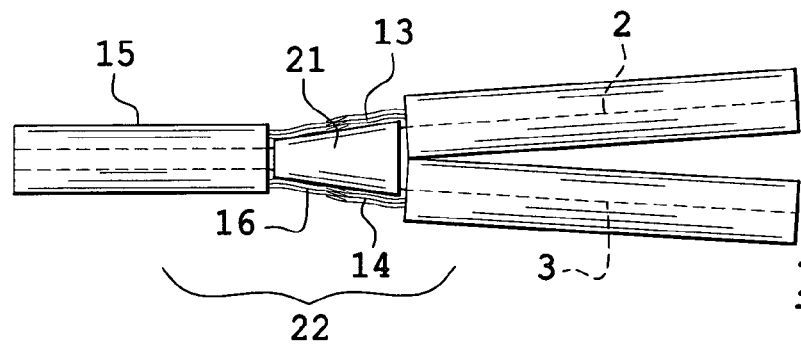
FIG. 2c is a drawing showing the principle of a coupler according to the invention during a third step of manufacture.

As shown in FIG. 2c, the wicks 13, 14 and 16 are folded down on the entire rim of this first sheath 21 and are intermingled so as to again form a plait all around this first sheath 21.

Figure 2D:
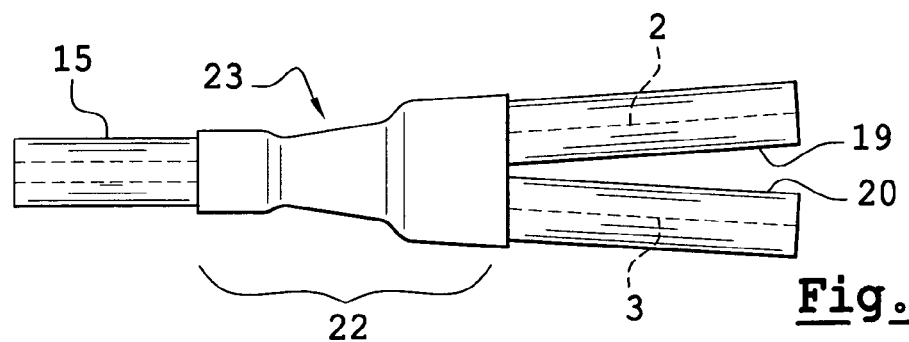
FIG. 2d is a drawing showing the principle of a coupler according to the invention during a fourth step of manufacture.

According to FIG. 2d, the entire connection zone 22 is surrounded by a second protective sheath 23. This second protective sheath 23 is preferably bonded. It covers at least a part of the sleeve 15, namely at least the part from which the bared optical fiber portions 17 and 18 emerge. This second, or outer sheath 23 also covers the plait formed by the wicks 13, 14 and 16 and therefore also covers the first heat-shrinkable sheath 21. Finally, the second sheath 23 also covers cable portions 19 and 20 of the fibers 2 and 3 at which the bared optical fibers 17 and 18 emerge. The second sheath 23 is bonded at least to the first sheath 21. In the example shown, to connect the first device to two second devices, the second sheath 23 forms a Y-shaped protective conduit in which the stem of the Y is formed by the sleeve 15.

For the first embodiment, in order that there may be no loss of signal from the sender unit 4, it is absolutely necessary for each end 9 and 10 of the fibers 2 and 3 to receive the totality of the signal sent out by the source of this sender unit 4. To this end, the beam sent by the sender unit 4 should be wide enough to be able to cover the total surface area of the two ends 9 and 10 when they are attached and juxtaposed. In this case, the source of the sender unit 4 is for example a LED, such that its surface of sensitivity or its beam diameter is wide enough to cover the totality of the services of the optical fibers presented before it.

Should the beam sent by the sender unit 4 have an excessively small diameter, a lens is interposed between the beam sent by this sender unit 4 and the ends 9 and 10 of the optical fibers. In this case, the lens is easily accessible and can easily be replaced if necessary.

In one variant, if the beam is wide enough, it can even be planned not to bare the optical fibers 2 and 3 when they are inserted into the sleeve 15.

What is claimed is:

1. An optical coupler for transmitting an optical signal between a first device and at least a plurality of second devices, the optical coupler comprising:
   a plurality of optical fibers each having first and second ends, a portion of each of the fibers being stripped, the first device disposed in optical communication with the second end of each one of the at least the plurality of optical fibers, one second device disposed in optical communication with the first end of at least one of the optical fibers, and another second device disposed in optical communication with the first end of at least another one of the optical fibers and with the second ends of the optical fibers being juxtaposed in the first device, a sleeve being provided which surrounds the second ends of the optical fibers and from which the stripped portion of each of the optical fibers protrudes, and further comprising
   a first, heat shrinkable sheath that surrounds a stripped portion of each of the optical fibers which extends from the sleeve to a portion of each of the optical fibers that is not stripped, wherein
   the sleeve and optical fibers having wicks, and the sleeve wicks and optical fiber wicks are intermingled around the first, heat-shrinkable sheath.

2. The optical coupler of claim 1 wherein each one of the second ends are stripped, disposed side-by-side, and stuck in the sleeve.

3. The optical coupler of claim 1 further comprising a second sheath surrounding at least a portion of the first sheath, at least a portion the sleeve, and at least the unstripped portion of each optical fiber.

4. The optical coupler of claim 3 wherein the second sheath is bonded to the first sheath.

5. The optical coupler of claim 3 wherein the second sheath forms a Y-shaped conduit around each one of the optical fibers.

6. The optical coupler of claim 1 wherein the first device is a transmitter and each second device is a receiver.

7. An optical coupler for conveying an optical signal comprising:
 (a) a transmitter;
 (b) a pair of receivers;
 (c) a pair of optical links with each optical link having one end disposed in communication with the transmitter, the other end of one optical link disposed in communication with one receiver, and the other end of the other optical link disposed in communication with the other receiver, wherein a stripped portion of the other end of the one optical link and a stripped portion of the other end of the other optical link are disposed adjacent each other;
 (d) a sleeve disposed adjacent the transmitter in which the stripped ends the optical links are disposed, the sleeve and optical links having wicks;
 (e) a first protective sheath surrounding each of the optical links and disposed between the transmitter and the receivers, the sleeve wicks and optical link wicks being intermingled around the first sheath; and
 (f) a second protective sheath surrounding the first sheath and forming a generally Y-shaped conduit.

8. The optical coupler of claim 7, wherein the first sheath is a heat shrinkable sheath and overlies a stripped portion of each of the optical links that extends from the sleeve to a portion of the optical link that is not stripped.

9. An optical coupler comprising:
 (a) a transmitter;
 (b) a pair of receivers;
 (c) a pair of optical fibers that each have an outer covering with each optical fiber having one end stripped of the outer covering and connected to the transmitter with the stripped ends of the optical fibers disposed side-by-side with one another and the other end of one of the optical fibers connected to one receiver, and the other end of the other of the optical fibers connected to the other receiver;
 (d) a sleeve that surrounds an end of each of the optical fibers and that is disposed between the transmitter and the receivers, the sleeve and optical fibers having wicks; and
 (e) a sheath that forms a generally Y-shaped conduit and that extends about each of the optical fibers, the sleeve wicks and optical fiber wicks being intermingled beneath the sheath.

10. The optical coupler of claim 9, wherein the sheath is an outer sheath, and further comprising
 an inner sheath that is overlaid by the outer sleeve and that extends from an end of the transmitter toward each one of the receivers, wherein the inner sheath is a heat shrinkable sheath and overlies a stripped portion of each of the optical fibers that extends from the sleeve to a portion of the optical fiber that is not stripped.

11. An optical coupler comprising:
 (a) a transmitter;
 (b) a pair of receivers;
 (c) a pair of optical fibers that each extend from the transmitter to one of the receivers with one of the optical fibers extending from the transmitter to one of the receivers and the other one of the optical fibers extending from the transmitter to the other one of the receivers;
 (d) an outer sheath that forms a generally Y-shaped conduit and that extends about each one of the optical fibers;
 (e) an inner sheath that underlies the outer sheath, and that overlies the optical fibers; and
 (f) a sleeve that underlies the outer sheath, that overlies an end of each of the optical fibers, and that extends from the transmitter toward an end of both receivers, the sleeve and optical fibers having wicks, the sleeve wicks and optical fiber wicks being intermingled around the inner sheath.

12. The optical coupler of claim 11, wherein the inner sheath is a heat shrinkable sheath and overlies a stripped portion of each of the optical fibers that extends from the sleeve to a portion of the optical fiber that is not stripped.

13. An optical coupler comprising:
 (a) a transmitter;
 (b) a pair of receivers;
 (c) a pair of optical fibers that each extend from the transmitter to one of the receivers with one of the optical fibers extending from the transmitter to one of the receivers and the other one of the optical fibers extending from the transmitter to the other one of the receivers; and
 (d) a sleeve that surrounds an end of each of the optical fibers and that is disposed between the transmitter and the receivers, the sleeve and optical fibers having wicks, the sleeve wicks and optical fiber wicks being intermingled around a first sheath.

14. The optical coupler of claim 13, wherein the first sheath is a heat shrinkable sheath and overlies a stripped portion of each of the optical fibers that extends from the sleeve to a portion of the optical fiber that is not stripped.

* * * * *